(12) United States Patent
Tulett et al.

(10) Patent No.: US 11,808,285 B2
(45) Date of Patent: Nov. 7, 2023

(54) SPA FILTRATION SYSTEM AND METHOD

(71) Applicant: Bullfrog International, LC, Herriman, UT (US)

(72) Inventors: Nathan Tulett, Pleasant Grove, UT (US); Eric Hales, Eagle Mountain, UT (US); Creed Larsen, Murray, UT (US)

(73) Assignee: Bullfrog International, LC, Herriman, UT (US)

( * ) Notice: Subject to any disclaimer, the term of this patent is extended or adjusted under 35 U.S.C. 154(b) by 160 days.

(21) Appl. No.: 17/131,327

(22) Filed: Dec. 22, 2020

(65) Prior Publication Data

US 2021/0199136 A1 Jul. 1, 2021

Related U.S. Application Data

(60) Provisional application No. 62/954,399, filed on Dec. 27, 2019.

(51) Int. Cl.
*B01D 46/24* (2006.01)
*B01D 46/00* (2022.01)
*B01D 29/15* (2006.01)
*F04D 29/70* (2006.01)

(52) U.S. Cl.
CPC ........... *F04D 29/708* (2013.01); *B01D 29/15* (2013.01); *B01D 46/0004* (2013.01); *B01D 46/2411* (2013.01)

(58) Field of Classification Search
CPC ............................ E04H 4/1209; E04H 4/1281
See application file for complete search history.

(56) References Cited

U.S. PATENT DOCUMENTS

| 4,533,476 | A | * | 8/1985 | Watkins | ............. | A61H 33/0087 |
| | | | | | | 4/DIG. 9 |
| 6,395,167 | B1 | | 5/2002 | Mattson, Jr. et al. | | |
| 2005/0211613 | A1 | | 9/2005 | King | | |
| 2007/0289057 | A1 | * | 12/2007 | Ludlow | ................ | A61H 33/027 |
| | | | | | | 4/541.1 |
| 2019/0048604 | A1 | | 2/2019 | Guy et al. | | |

FOREIGN PATENT DOCUMENTS

WO 2019032892 A1 2/2019

OTHER PUBLICATIONS

Australian Patent Office, "First Examination Report," Australian Application No. 2020260543, dated Oct. 22, 2021.
Canadian Patent Office, "Examiner's Report," Canadian Application No. 3,097,724, dated Oct. 28, 2021.

\* cited by examiner

*Primary Examiner* — Benjamin M Kurtz
(74) *Attorney, Agent, or Firm* — Dentons Durham Jones Pinegar; Sarah W. Matthews

(57) ABSTRACT

A system for filtering water in a spa is described, and may include a housing that defines a receptacle for receiving a framework. The housing may include a cover and a back element, the cover and the back element connectable to form the receptacle. The back element may comprise an inlet port and an outlet port. The framework includes a rectangular slot for receiving a rectangular filter media, and one or more openings for receiving one or more mineral cartridges.

16 Claims, 13 Drawing Sheets

SPA FILTRATION SYSTEM AND METHOD

CROSS REFERENCE TO RELATED APPLICATION

A claim for priority to the Dec. 27, 2019 filing date of U.S. patent application Ser. No. 62/954,399, titled SPA FILTRATION SYSTEM AND METHOD ("the '399 Provisional Application") is hereby made pursuant to 35 U.S.C. § 119(e). The entire disclosure of the '399 Provisional Application is hereby incorporated herein.

TECHNICAL FIELD

The present disclosure relates generally to a system for filtering water in a spa. More specifically, the present disclosure relates to a spa filtration system and method that utilizes a filter housing that may be placed, for example, on a sidewall of a spa, or behind a removable seat of a spa.

RELATED ART

Spas are typically fitted with filters to clean the water. Filters of various configurations are used to remove solid particles and debris from the circulated water. Filters are typically mounted in-line within the pool or spa circulation system and have a liquid-permeable filter media such that when the circulation system is in operation, the water can be pulled through the filter and pumped back into the pool or spa, leaving the captured debris on the filter for subsequent removal.

One type of filter often used is a conventional cartridge filter. It is comprised of a cylindrical filter element with one or more layers or sheets of a porous material configured with a pore size to allow for the passage of water while trapping and removing solid particles. As the filter traps more and more solid particles, the pores in the filter media become clogged, inhibiting the flow of water through the circulation system and decreasing performance and, possibly, even damaging the circulation pump. Cartridge filters typically use relatively large sheets of the porous filter material that are pleated to provide an increased filter surface area, thus increasing the life and performance of the filter, while not increasing the filter's overall size.

However, as particles and debris become lodged between the pleats, the useful filter surface area that is lost is effectively doubled because the particles and debris clog pores on both adjacent surfaces of the pleat. Thus, cartridge filters become clogged and experience decreased flow rates relatively quickly. Another problem with cartridge filters is that they cannot be readily cleaned after becoming clogged. To clean out debris trapped deep within the pleat folds, high pressure reverse flow or meticulous debris removal using a vacuum or manual technique between each pleat is necessary. Often, the cartridge must be soaked overnight in a cartridge cleaning solution and then be thoroughly cleaned a second time before being returned to use. Because of these inconveniences, some pool and spa owners simply use their cartridge filters until they become clogged and discard them, often prematurely, rather than bothering to clean them out and reuse them.

Another problem with conventional filtration systems is that they may not adequately remove particles and impurities in the water, especially when the filter has not been cleaned or replaced for some time. This may result in unsatisfactory and unsanitary conditions for the user, and may also result in degradation of system components.

SUMMARY

A spa filtration system described herein may include: a housing defining a receptacle that receives a framework, the housing comprising a cover and a back element, the cover and the back element connectable to form the receptacle; the framework removably receivable within the receptacle of the housing, the framework comprising a rectangular slot and a first opening and a second opening; a rectangular filter media removably receivable within the rectangular slot of the framework; a first mineral cartridge removably receivable within the first opening of the framework and a second mineral cartridge removably receivable within the second opening of the framework.

In some configurations, the cover of the housing comprises an inner side and an outer side, the inner side of the cover removably attached to the framework.

According to another aspect, the cover further comprises a handle, and wherein the handle enables the cover to be removed from the back element. For example, the handle may enable the cover and the framework to be removed from the back element as a single piece.

According to another aspect, the system further comprises a spa shell comprising a plurality of convexities, with the housing connected to the spa shell at one of the plurality of convexities. In some configurations, one or more spa seat backs may be removably receivable within one or more of the plurality of convexities, and the housing may be connected to the spa shell behind one or more spa seat backs. In other configurations, the housing may be integral to the spa seat back.

According to another aspect, the back element comprises an inner side and an outer side, and wherein the outer side of the back element comprises a threaded boss. The back element may comprise an inlet port and an outlet port. In some configurations, the inlet port and outlet port are located within the threaded boss. The system may also include a spa shell having a circular opening, the threaded boss receivable in the circular opening, and wherein the system further comprises a gasket encompassing the threaded boss on the interior side of the spa shell, and a nut threaded to the threaded boss on an exterior side of the spa shell.

According to another aspect, a filtering system for a spa may include: a housing defining a receptacle that receives a framework, the housing comprising a cover and a back element, the cover and the back element connectable to form the receptacle, wherein the back element comprises an inlet port and an outlet port, and a threaded boss for connection to a spa shell; the framework removably attached to the cover of the housing, the framework comprising a rectangular slot and a first opening; and a rectangular filter media removably receivable within the rectangular slot of the framework.

In some configurations, a first mineral cartridge may be removably receivable within the first opening of the framework. Other configurations may comprise a second opening in the framework and a second mineral cartridge removably receivable within the second opening of the framework, and some configurations may have three or more openings with mineral cartridges removably receivable in such openings The inner side of the cover may comprise one or more projections connectable to the framework, and/or one or more projections connectable to the first mineral cartridge.

According to yet another aspect, a method of filtering water in a spa is described, the method comprising: selecting a system as described herein; connecting the housing to a spa shell via the threaded boss; moving water from a spa weir to the inlet port, from the inlet port through the housing and filter media, and from the housing to the outlet port, by exerting a pulling force on the outlet port of the housing. The pulling force may be caused by one or more pumps.

Other aspects of the disclosed subject matter, as well as features and advantages of various aspects of the disclosed subject matter, should be apparent to those of ordinary skill in the art through consideration of the ensuing description, the accompanying drawings, and the appended claims.

BRIEF DESCRIPTION OF DRAWINGS

The following drawings illustrate what are currently considered to be specific representative configurations for carrying out the disclosed subject matter and are not limiting as to embodiments which may be made in accordance with this disclosure. The components in the drawings are not necessarily to scale relative to each other. Like reference numerals designate corresponding parts throughout the several views.

DETAILED DESCRIPTION

Hereinafter, exemplary embodiments of the present disclosure will be described in detail with reference to the accompanying drawings. Advantages and features of the present disclosure and methods accomplishing them will become apparent from the following description of exemplary embodiments with reference to the accompanying drawings.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

As used herein, the term "inner side" refers to the portion of the system that faces the interior of the housing of the filtering system. As used herein, the term "outer side" refers to portions of the system that do not face the interior of the housing. As used herein, "front side" refers to portions of the system that are more proximal to the interior spa shell, and "back side" refers to portions of the system that are more distal to the interior spa shell when the system is in place. The interior of the spa shell as used herein refers to the side of the spa shell typically used by bathers.

Figure 1:
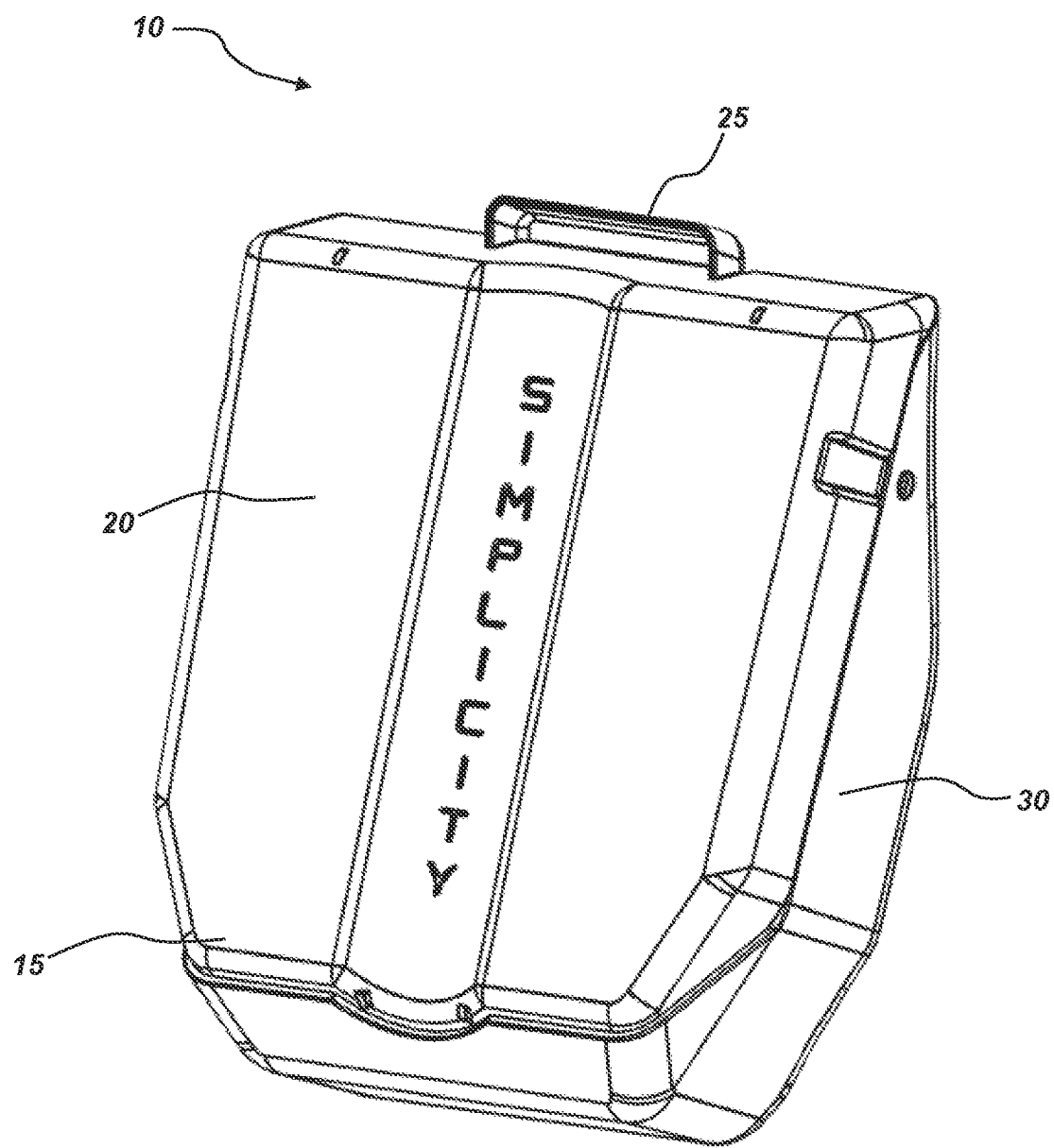
FIG. 1 is a front perspective view of a spa filtration system as described herein.

This disclosure generally relates to a system for filtering water through a spa or pool. One particular embodiment of the present disclosure is shown and described in FIGS. 1-12. Referring to FIG. 1, the system 10 may include a housing 15, a cover 20, a back element 30 and a handle 25.

Figure 2:
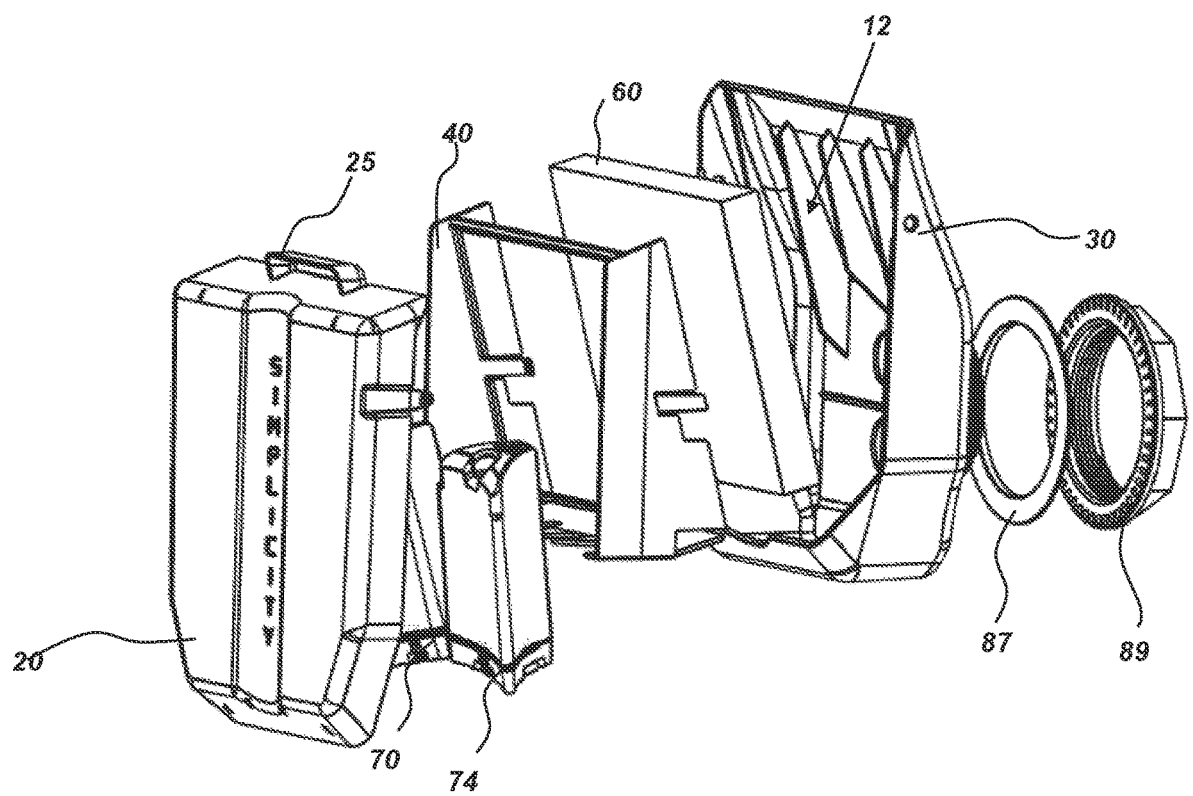
FIG. 2 is a side, perspective exploded view of the spa filtration system of FIG. 1.
Figure 3:
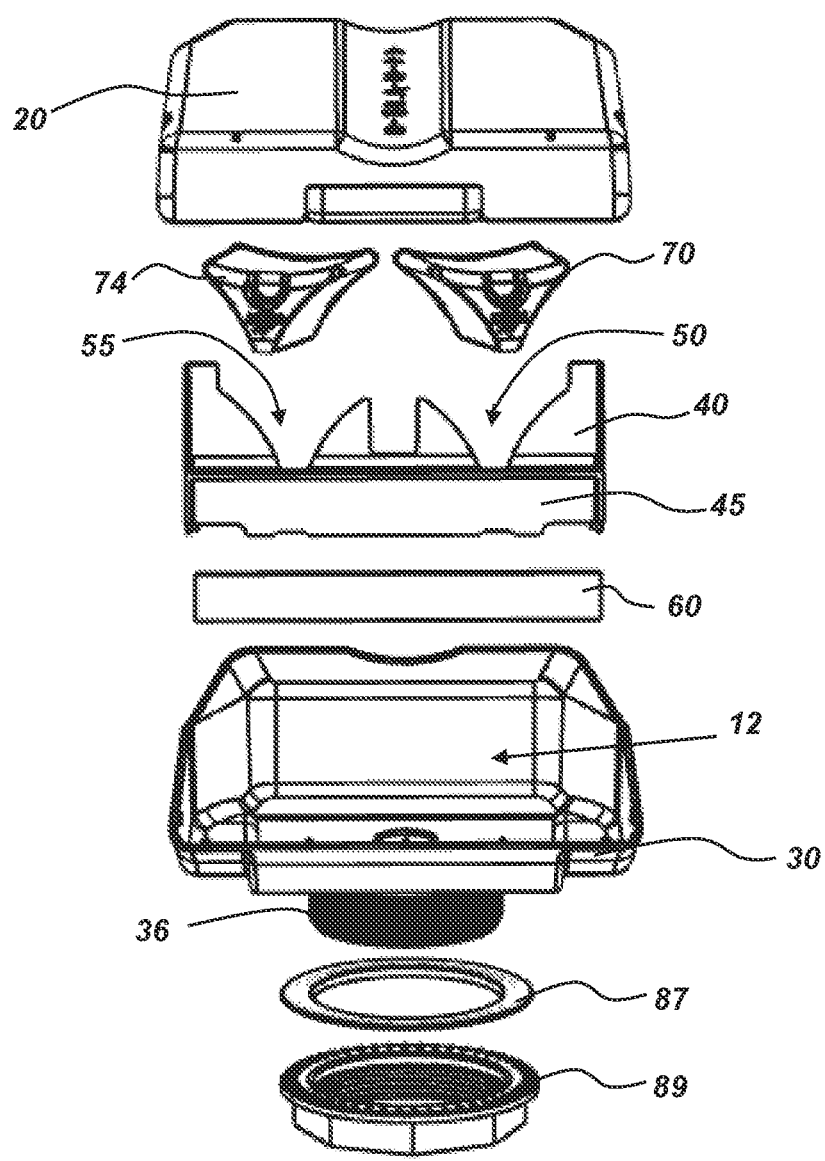
FIG. 3 is a top, exploded view of the spa filtration system of FIG. 1.
Figure 4:
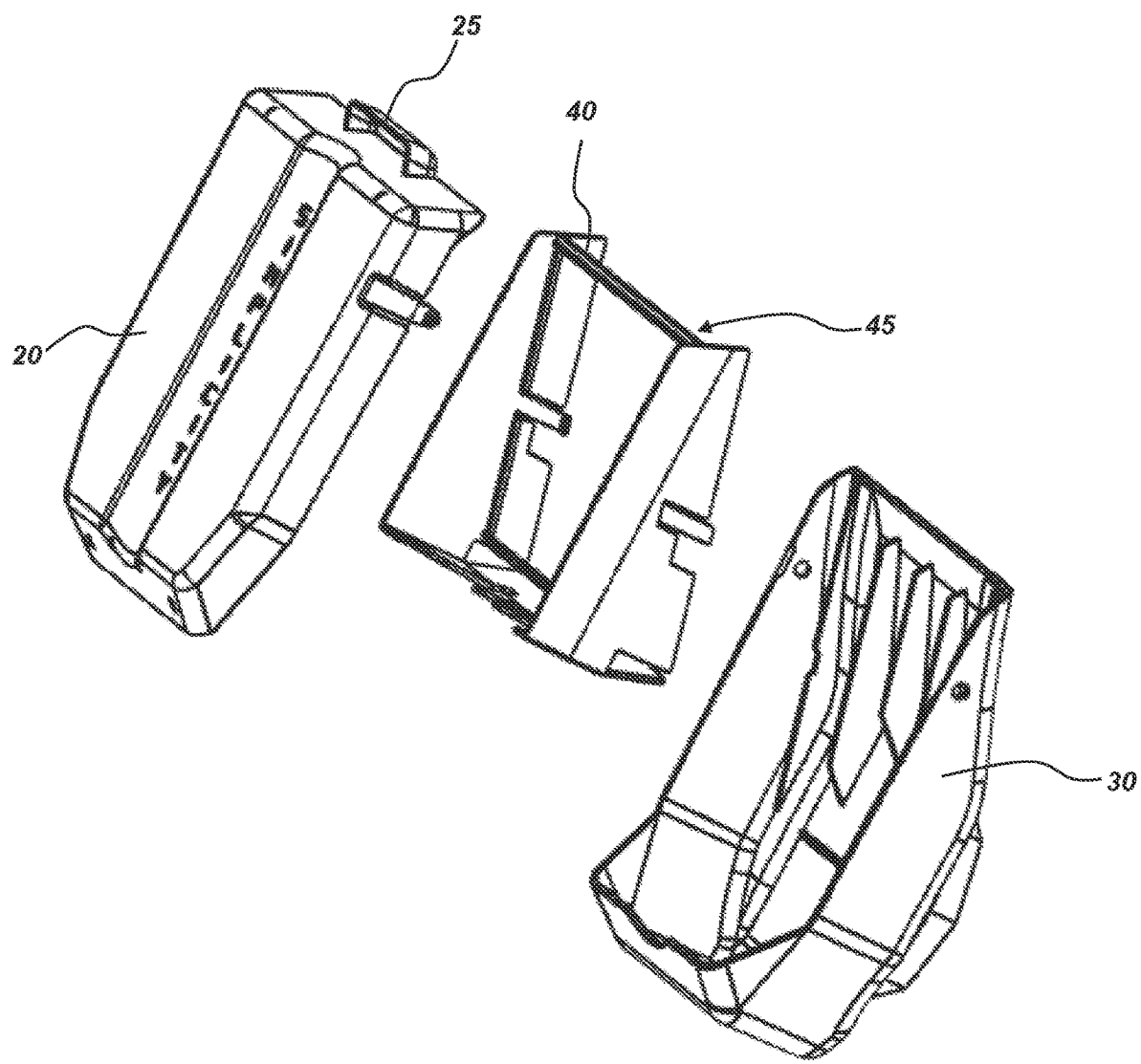
FIG. 4 is a side, perspective exploded view of the spa filtration system of FIG. 1, with the filter and mineral cartridges removed for clarity.

As seen in the exploded view of FIG. 2 and FIG. 3, the system may generally comprise the housing 15 comprising the cover 20 and the back element 30. The cover 20 and back element 30 may be removably connectable, such that the cover 20 may be removed from the back element 30 to access an interior 12 of the housing 15. The cover 20 and back element 30 define the interior or receptacle 12 of the housing 15. The receptacle 12 may receive a framework 40. The framework 40 may comprise a rectangular slot 45, a first opening 50, and a second opening 55 (see FIG. 3). One or more of the rectangular slot 45, the first opening 50, and the second opening 55 may be used to hold replaceable water treatment products, such as filter media and/or mineral cartridges.

Figure 5:
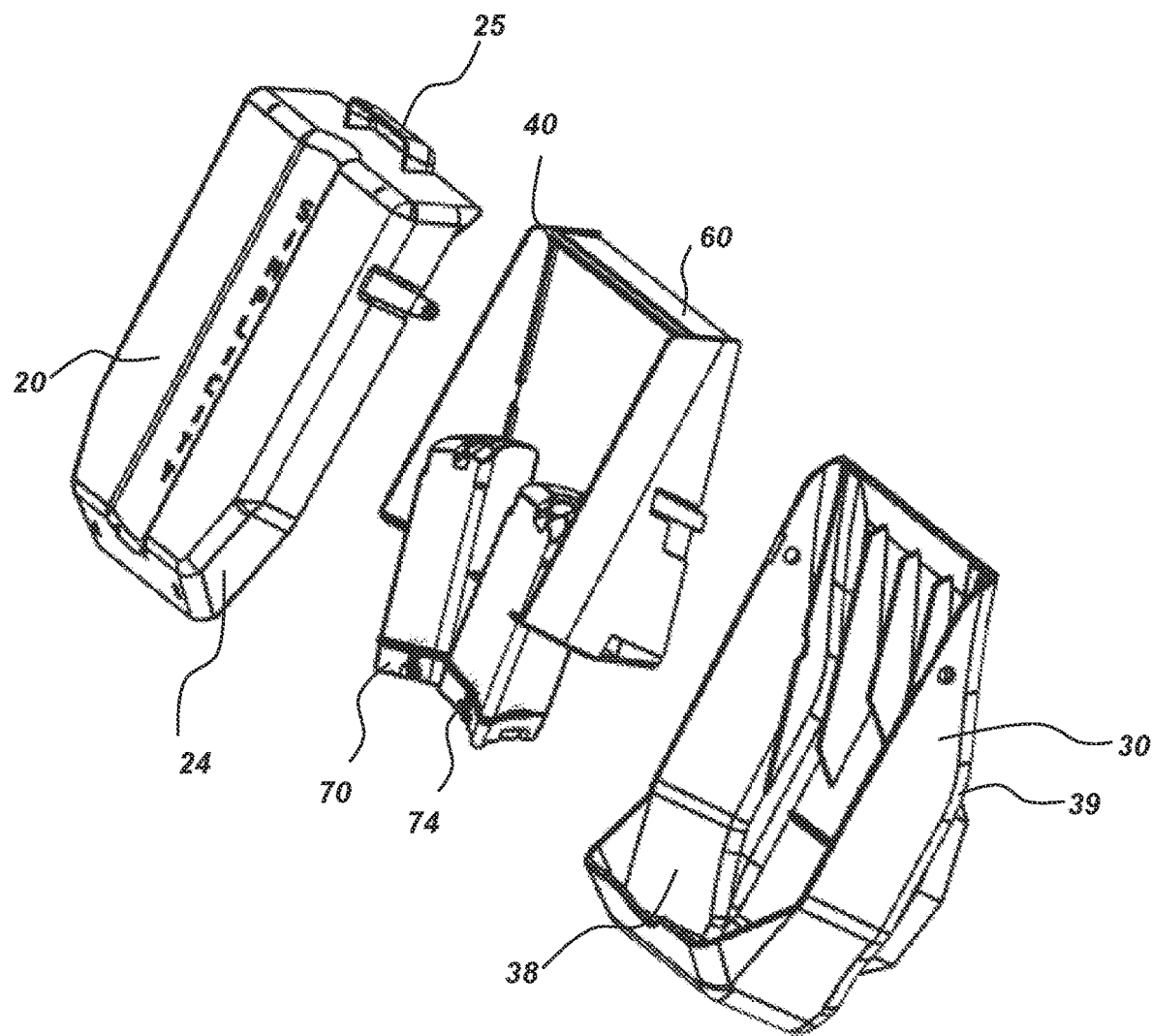
FIG. 5 is a side, perspective, exploded view of the spa filtration system of FIG. 1, with the filter and mineral cartridges attached to the framework.
Figure 6:
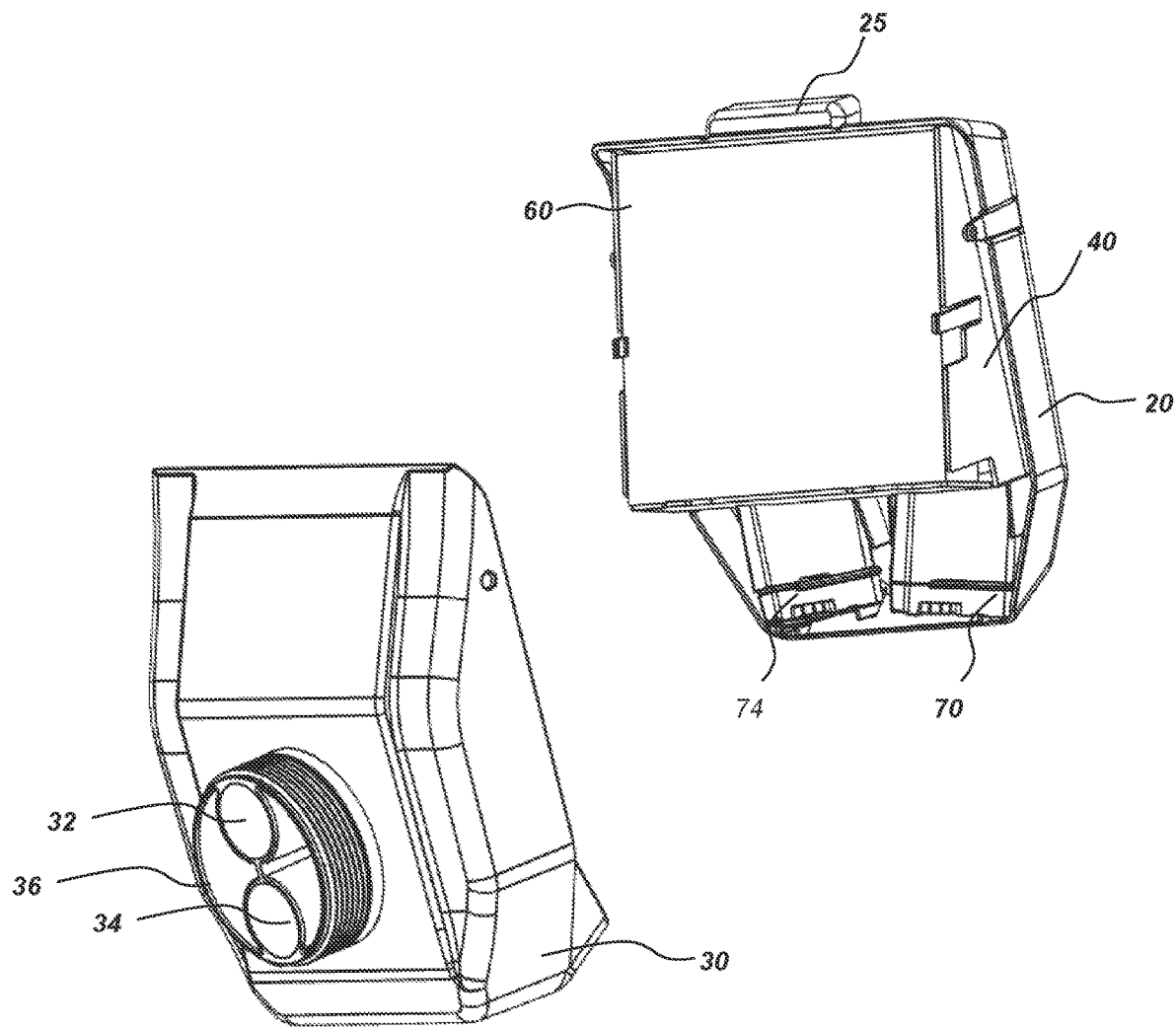
FIG. 6 is a rear, perspective, exploded view of the spa filtration system of FIG. 1, with the framework attached to the inner side of the cover.

The system 10 may include an inlet port 32 and an outlet port 34 (see FIG. 6). In the configuration shown in FIGS. 1-8, the inlet port 32 is located above the outlet port 34, at the back or outer side of the back element 30. This placement may facilitate movement of the water through the housing 15 by the action of gravity, in addition to movement of the water by the action of the spa pumps described in more detail below. The inlet port 32 of the housing 15 may be in communication with a weir to receive water from the shell of the spa. In other configurations, the inlet port may be in communication with another inlet, drain, etc., to receive water from the shell of the spa. In one configuration, the outlet port 34 may be in communication with one or more spa pumps, such that the action of the spa pumps pushing water outwardly into the spa shell causes water to flow from the inlet port 32, through the housing 15, and out the outlet port 34 to one or more spa jets.

Figure 7:
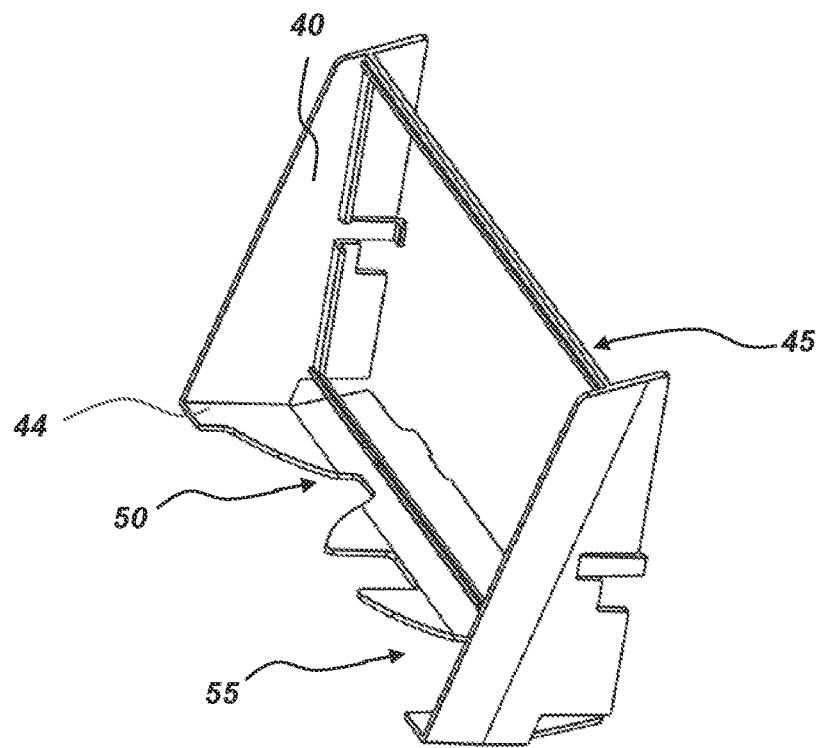
FIG. 7 is a top perspective view of the framework of the spa filtration system.
Figure 8:
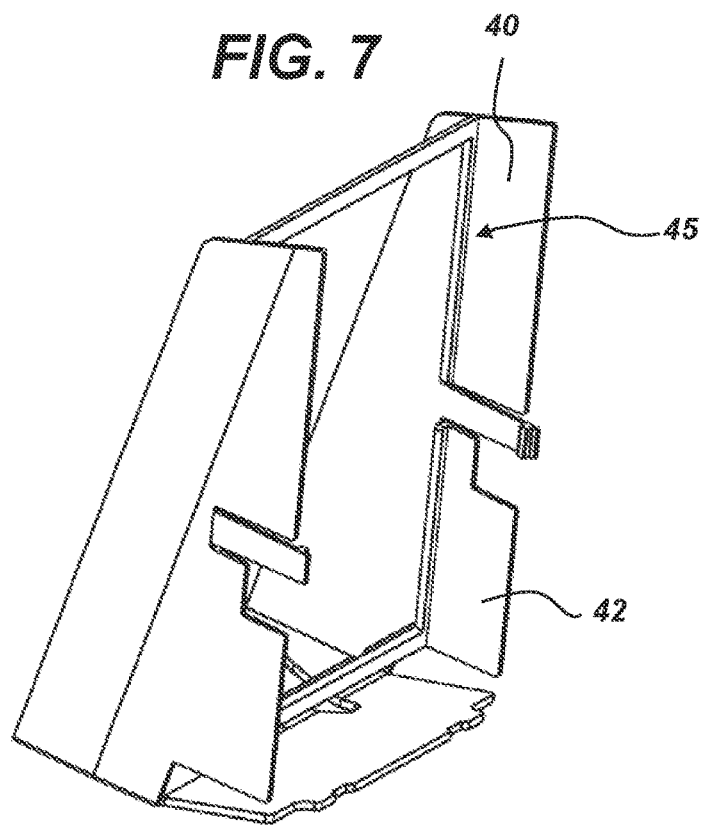
FIG. 8 is a side, rear perspective view of the framework of FIG. 7.
Figure 9:
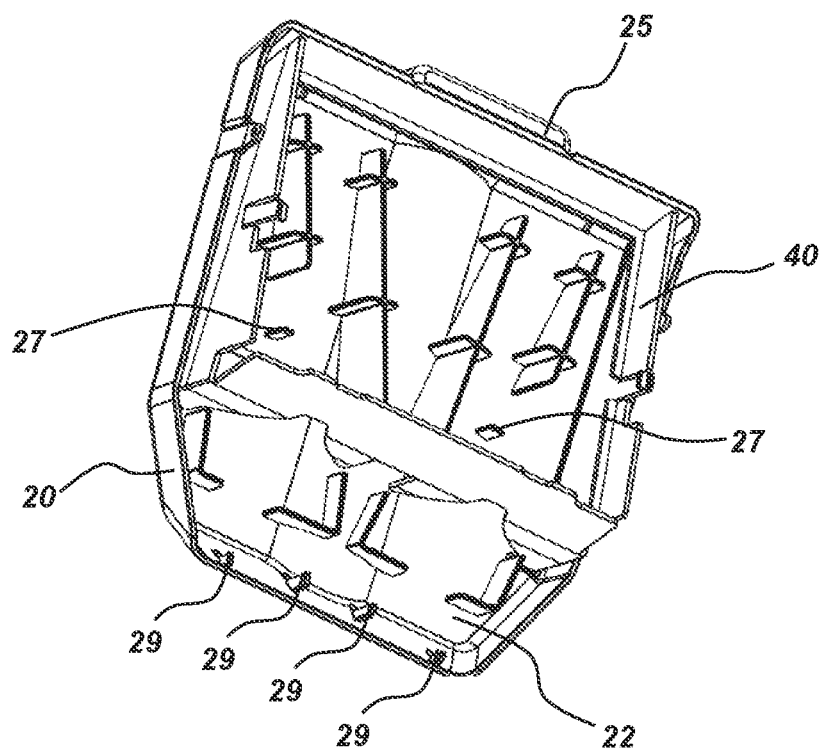
FIG. 9 is a rear, perspective view of the inner side of the cover of the spa filtration system of FIG. 1, with the framework attached to the inner side.
Figure 10:
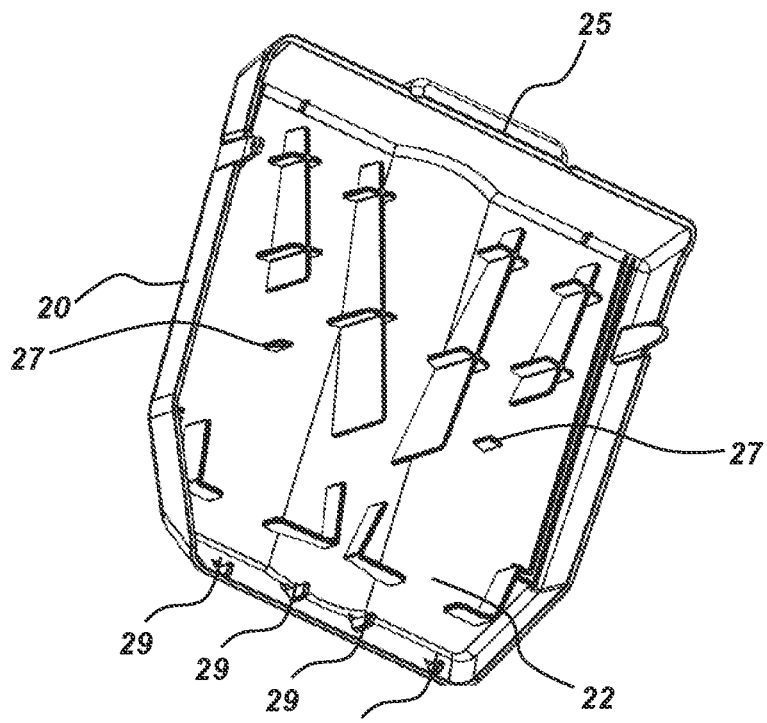
FIG. 10 is a rear, perspective view of the inner side of the cover of FIG. 9, without the framework attached to the inner side.
Figure 11:
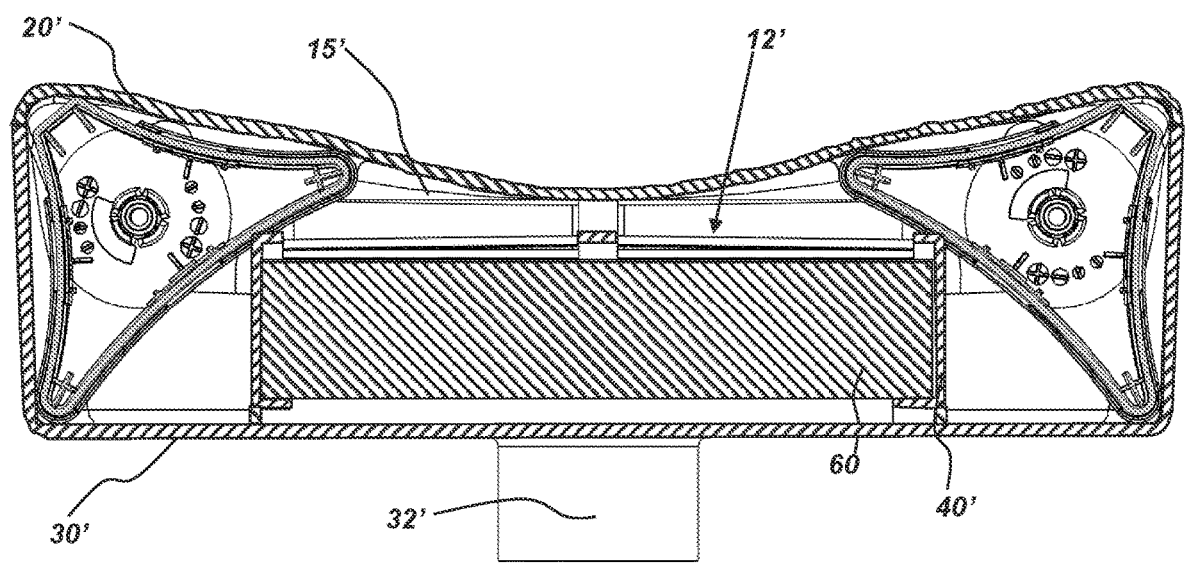
FIG. 11 is a top, cross-sectional view of a configuration of a spa filtration system.

The housing 15 may receive a framework 40, and the framework 40 may be configured to hold and/or receive one or more replaceable water cleaning elements. As seen in FIGS. 7-8, the framework 40 may comprise a rectangular slot 45 proximal to a back side 42 of the framework 40. The rectangular slot 45 may be sized to receive a rectangular filter media 60. The rectangular filter media 60 may comprise any suitable filter media that provides filtration of debris of a specific size. For example, pleated point bonded filtration fabric may be used, or any other suitable filter media and the filter media 60 may be rated to screen particles larger than 15 microns, larger than 10 microns, larger than 5 microns, etc. According to one non-limiting embodiment, the rectangular filter media 60 may be around 8 to 16 inches wide, around 10 to 20 inches long, and around 0.5 to 2 inches deep. The use of a rectangular filter media 60 may also provide more efficient filtering compared to a cartridge filter. In other configurations, the slot 45 and/or filter media 60 may have a different shape, such as cylindrical or any other suitable shape.

According to another aspect, the cover 20 of the housing 15 may comprise an inner side 22 and an outer side 24. The inner side 22 of the cover 20 may be removably attached to the framework 40 (see FIGs. 6 and 9). For example, in some configurations, the inner side 22 of the cover 20 may be provided with one or more projections 27 connectable to the framework 40. The projections 27 may complementary fit with recesses in the framework 40. Additionally, or alternatively, the inner side 22 of the cover 20 may be provided with one or more projections 29 connectable to one or more mineral cartridges (see FIGs. 6 and 9 to 10). For example, the cartridges may be supported vertically by one or more projections 29. In other configurations, the inner side 22 of the cover 20 may not be provided with projections 27, 29.

In some configurations, the cover 20 may also be provided with the handle 25 on an outer side 24. In configurations with a cover 20 having both a handle 25 and a framework 40 removably attached to inner side 22, it may be possible for a user to lift up on the handle 25 and remove both the cover 20 and the framework 40 from the back element 30 of the housing 15 by a single action. The handle 25 may enable the cover 20 and the framework 40 to be removed from the back element 30 as a single piece. This may also provide an ease of use for the filter system 10.

In some configurations, the framework 40 may further comprise one or more openings, such as a first opening 50 and a second opening 55. The openings may be formed, for example, in the front side 44 of the framework 40 (FIG. 7 and FIG. 8). The opening(s) 50, 55 may be configured to receive one or more water treatments, such as a mineral cartridge. In some configurations, a first mineral cartridge 70 may be removably receivable within the first opening 50 of the framework 40, and a second mineral cartridge 74 may be removably receivable within the second opening 55 of the framework 40 (see FIGs. 5-6). In other configurations, a single opening may be provided for removably receiving a single mineral cartridge or other water treatment. In other configurations, the framework 40 may not include openings 50, 55 for mineral cartridges 70, 74. Alternatively, openings for as many mineral cartridges or other water treatments may be provided, such as openings for three or more mineral cartridges. By providing space to receive not only filter media but also other disposable water treatments, the framework 40 may house in a single place all the water treatments for the spa needed to be changed on a regular basis. This may provide a convenient method to reduce the amount of work needed to maintain the cleanliness of the spa water.

Referring to FIG. 5 and FIG. 6, in at least one embodiment, the housing 15 may be connected to the spa shell via a threaded boss 36. For example, the back element 30 may comprise an inner side 38 and an outer side 39, and the outer side 39 may comprise a threaded boss 36. The threaded boss 36 may pass through a hole in the spa shell to the outer side of the spa shell. A gasket 87 (FIG. 2 and FIG. 3) may be provided around the threaded boss 36 and between the outer side 39 of the back element 30 and the inner spa shell wall to reduce leaks. A threaded nut 89 (FIG. 2 and FIG. 3) may be provided on the outer spa shell wall to mate with the threaded boss 36. According to another aspect, the inlet port 32 and the outlet port 34 may be located within the threaded boss 36. In other configurations, the housing 15 may be connected to the spa shell through one or more openings. In addition to a threaded boss 36, press-fit or snap-fit options to secure the housing 15 to the spa shell may be used.

Figure 14:
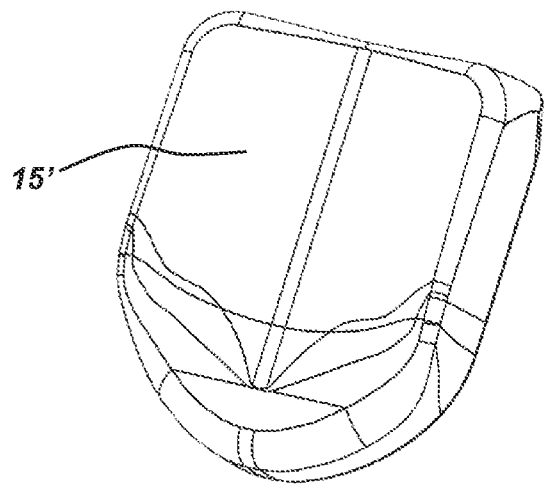
FIG. 14 is a perspective view of another configuration of a spa filtration system as described herein.
Figure 15:
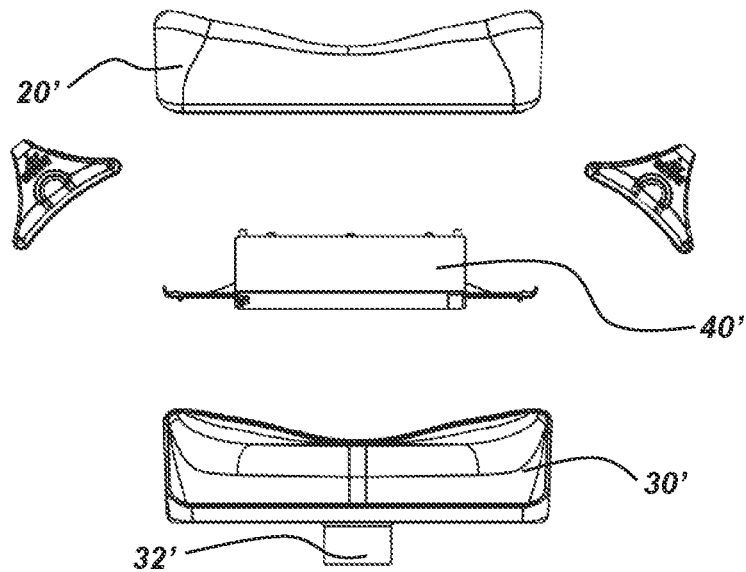
FIG. 15 is a top, exploded view of the spa filtration system of FIG. 14, without the filter shown for clarity.
Figure 16:
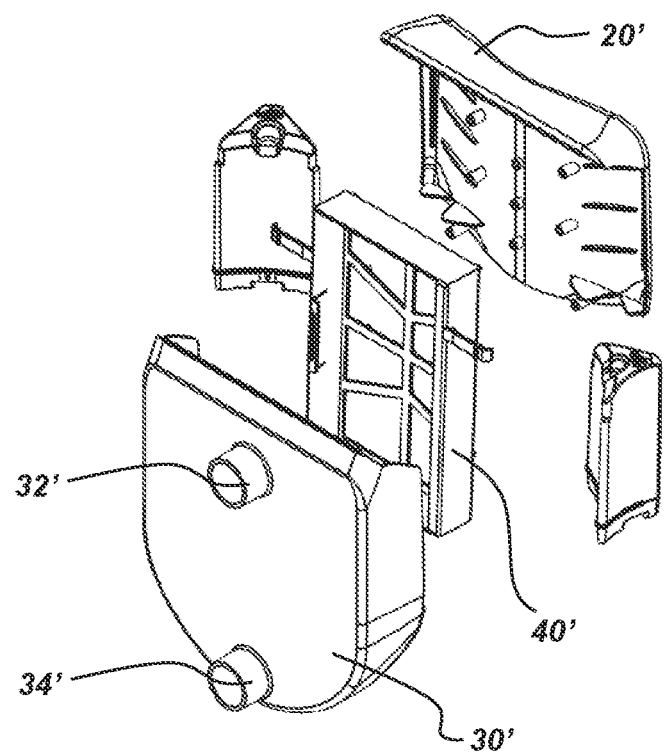
FIG. 16 is a rear, perspective exploded view of the spa filtration system of FIG. 14, without the filter shown for clarity.

An alternate configuration of the filter system is shown in FIGS. 14 through 16. The system 10' may generally comprise a housing 15', a cover 20', a back element 30', and a framework 40'. As seen in FIG. 16, the inlet port 32' and outlet port 34' are spaced apart from each other, and this configuration does not utilize a threaded boss.

According to another aspect, a method of filtering water in a spa is provided. First, a filtering system may be provided. For example, a filtering system as described in any of the configurations herein may be provided. The filtering system may be attached to the inside of the spa shell. In configurations where the filtering system is located behind a Jetpak® removable seat back or other removable seat back, the filtering system may be connected to the inside of the spa shell, and the Jetpak® removable seat back may be placed in front of the housing 15. The filtering system may also be placed behind one or more other types of removable structures other than a removable seat back.

The system may move water, via at least one pump, from inside the spa shell, for example, from a spa weir to the inlet port 32. Or, the system may receive water from inside the spa shell from another intake, such as a drain, etc. The water may be drawn from the inlet port 32, through the housing 15, including through the filter media 60 and/or mineral cartridge(s) located in the receptacle 12 of the housing 15, and from the housing 15 to the outlet port 34. The water may be pulled, for example, by exerting a pulling force on the outlet port 34 of the housing 15. In some configurations, this pulling force may be exerted by one or more spa pumps, pulling the filtered water from the outlet port 34 to the spa jets and out into the spa shell.

Figure 12:
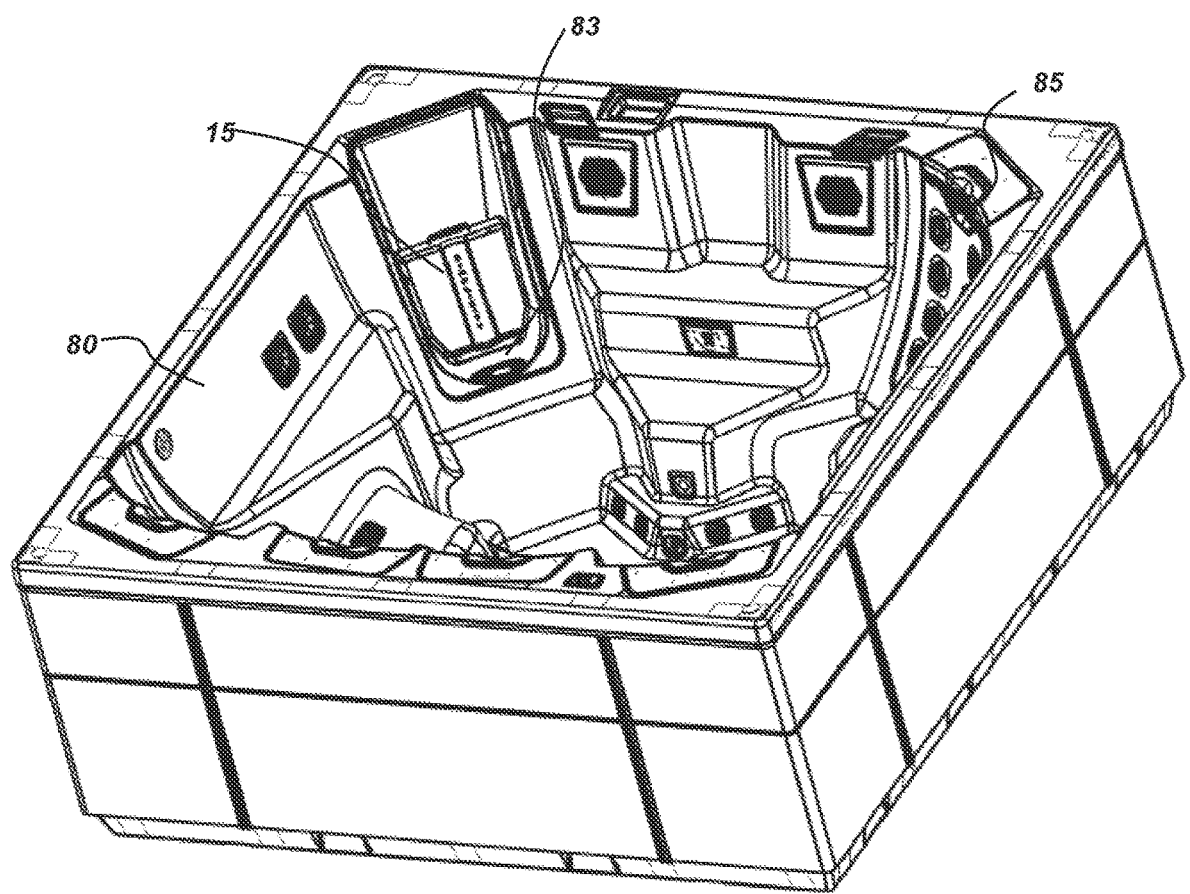
FIG. 12 is a perspective view of a spa having a spa filtration system connected to the spa shell.
Figure 13:
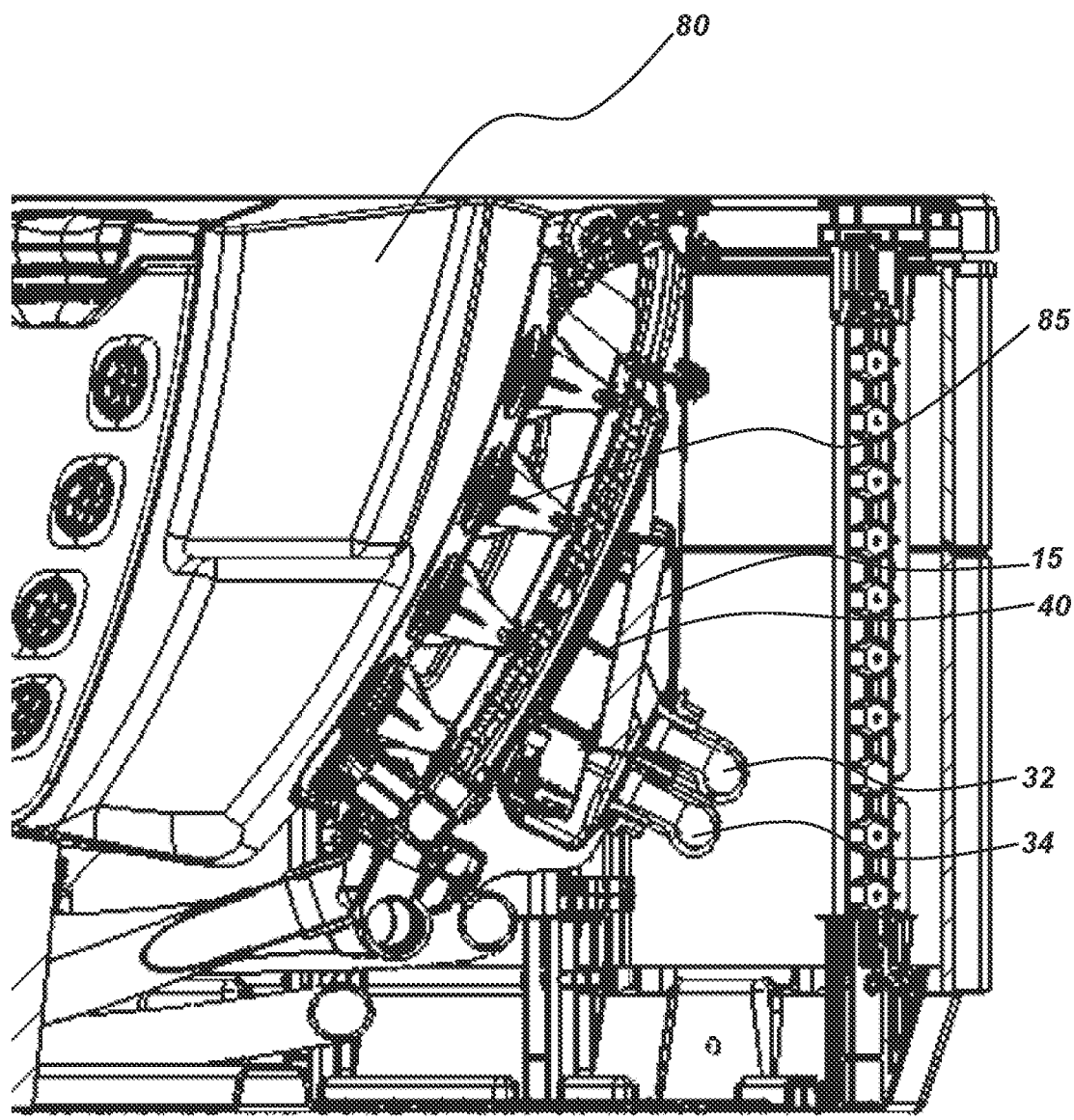
FIG. 13 is a partial cut-away view of the spa of FIG. 12.

According to another aspect, the filter system described herein may be located in a space within a spa shell behind a spa seat back, such as a Bullfrog International Jetpak® removable spa seat back. For example, as seen in FIG. 12, a spa shell 80 may comprise a plurality of convexities 83. Convexities 83 may be formed to provide a comfortable seat for a user, and may also have a spa seat back 85 located in a proximal sidewall such that a user seated or reclined in the convexity 83 may have water pressure exerted on their back. There may be space behind the spa seat back 85, and the housing 15 of the filter system disclosed herein may be located in the spa shell 80 behind the spa seat back 85. This may reduce the amount of useable space within the spa shell 80 needed for a water filter system, and likewise increase the amount of space within the spa shell 80 for the users to enjoy for bathing. In other configurations, the housing 15 may be located in the sidewall of the spa and need not be placed behind a spa seat back 85. The housing 15 may also be formed integrally to a spa seat back 85.

The housing 15 of the filter system disclosed herein may be located in the spa shell 80 behind the spa seat back 85, and may be connected to the spa shell 80 in any suitable manner. In one exemplary configuration, the back element 30 may be provided with a threaded boss 36 to connect the back element 30 to the spa shell 80. The threaded boss 36 may pass through a hole in the spa shell 80 to the outer side of the spa shell 80. A gasket 87 (FIG. 2 and FIG. 3) may be provided around the threaded boss 36 and between the outer side 39 of the back element 30 and the inner spa shell wall to reduce leaks. A threaded nut 89 (FIG. 2 and FIG. 3) may be provided on the outer spa shell wall to mate with the threaded boss 36. In this configuration, the back element 30 of the filter system would remain in place once it is attached to the spa shell 80. The cover 20 may be removed from the housing 15, and the interior 12 of the housing 15 may be accessed with the back element 30 remaining in place.

When a user desires to change the filter media and/or mineral cartridges, the user may simply remove the spa seat back 85, and pull on the handle 25 of the cover 20 of the housing 15 to remove the cover 20 and framework 40 holding the filter media 60 and/or mineral cartridge(s) 70, 74. In other configurations where the framework 40 is not connected to the cover 20 of the housing 15, the cover 20 may be removed and the framework 40 separately removed. The framework 40 holding the filter media 60 and/or mineral cartridge(s) 70, 74 may be removed from the inner side of the cover 20, and the filter media 60 may be slid or otherwise removed from the rectangular slot 45. Similarly, the mineral cartridge(s) 70, 74 may be removed from the first opening 50 and/or second opening 55. A new filter media 60 may be placed in the rectangular slot 45, and one or more new mineral cartridges 70, 74 may be replaced in the first opening 50 and/or second opening 55. In some systems, the filter media 60 and mineral cartridge(s) 70, 74 may be designed to be replaced at the same rate. For example, at a rate of about every 3 to 5 weeks. In this manner, a user may replace both at the same time and reduce the amount of work needed to maintain clean water within the spa.

After the new filter media 60 and/or mineral cartridge(s) 70, 74 are placed within the framework 40, the framework 40 may be connected to the inner side 22 of the cover 20, and the cover 20 may be connected to the back element 30 of the housing 15. In other configurations where the cover 20 and framework 40 are not connected, the framework 40 may first be placed within the back element 30, and the cover 20 placed over the framework 40. The spa seat back 85 may then be replaced over the housing 15.

It will be appreciated that mineral cartridges 70, 74 may or may not be placed into the system and may be added to the spa or pool through a different element, means or mechanism.

The various embodiments described above, including elements of the various embodiments described above, can be combined to provide further embodiments. Various portions and components of apparatus within the scope of this disclosure, including, for example, structural components, can be formed by one or more various suitable manufacturing processes known to those in the art. Similarly, various portions and components of apparatuses within the scope of this disclosure can be made from suitable materials known to those in the art.

The above description has set out various features, functions, methods and other aspects of the disclosure. Time and further development may change the manner in which the various aspects are implemented.

The scope of protection defined by the claims is not intended to be limited to the specific sizes, shapes, features or other aspects of the disclosed embodiments. The claimed inventions may be implemented or embodied in other forms while still being within the scopes of the concepts disclosed hereby. Also included are equivalents of the elements of the claims that can be made without departing from the scopes of concepts properly protected by the claims that follow. Although the foregoing disclosure provides many specifics, such as use of the system in spas, it will be appreciated that pools, and other water holding devices to be filtered are contemplated and these should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. A system for filtering water in a spa, the system comprising:
    a housing defining a receptacle that receives a framework, the housing comprising a cover and a back element, the cover and the back element connectable to form the receptacle, wherein the back element comprises an inlet port and an outlet port, and a threaded boss for connection to a spa shell;
    the framework removably attached to the cover of the housing; and
    a spa shell comprising a plurality of convexities, and wherein the housing is connected to the spa shell at one of the plurality of convexities; and
    a spa seat back removably receivable within one or more of the plurality of convexities, and wherein the housing is connected to the spa shell behind the spa seat back.

2. The system of claim 1, wherein the framework comprises a first opening, the first opening capable of removably receiving a first mineral cartridge.

3. The system of claim 2, further comprising a second opening in the framework, the second opening capable of removably receiving a second mineral cartridge.

4. The system of claim 1, wherein an inner side of the cover comprises one or more projections connectable to the framework.

5. The system of claim 2, wherein an inner side of the cover comprises one or more projections capable of connection to the first mineral cartridge.

6. The system of claim 1, wherein the framework comprises a rectangular slot, the rectangular slot capable of removably receiving a rectangular filter media.

7. A method of filtering water in a spa, the method comprising:
    selecting the system of claim 1,
    connecting the housing to the spa shell via the threaded boss;
    moving water from a spa weir to the inlet port, from the inlet port through the housing and a filter media, and from the housing to the outlet port, by exerting a pulling force on the outlet port of the housing.

8. The method of claim 7, wherein the pulling force is caused by one or more pumps.

9. A system for filtering water in a spa, the system comprising:
- a housing defining a receptacle that receives a framework, the housing comprising a cover and a back element, the cover and the back element connectable to form the receptacle, wherein the back element comprises an inlet port and an outlet port, and a connector for connection to a spa shell;
- the framework removably attached to the cover of the housing; and
- a spa shell comprising a convexity, and wherein the housing is connectable to the spa shell at the convexity; and
- a spa seat back removably receivable within the convexity, and wherein the housing is connected to the spa shell behind the spa seat back.

10. The system of claim 9, wherein the connector comprises a threaded boss and a gasket for encompassing the threaded boss.

11. The system of claim 9, wherein the framework comprises a rectangular slot for removably receiving a rectangular filter media within the rectangular slot of the framework.

12. The system of claim 9, wherein the framework comprises a first opening for removably receiving a first mineral cartridge within the first opening of the framework.

13. The system of claim 12, further comprising a second opening in the framework for removably receiving a second mineral cartridge within the second opening of the framework.

14. The system of claim 9, wherein an inner side of the cover comprises one or more projections connectable to the framework.

15. The system of claim 9, wherein an inner side of the cover comprises one or more projections connectable to a first mineral cartridge.

16. The system of claim 9, wherein the cover is removable from the back element while the back element of the housing remains in place connected to the spa shell.

* * * * *